(12) United States Patent
Chhabra et al.

(10) Patent No.: US 9,713,088 B2
(45) Date of Patent: Jul. 18, 2017

(54) BUFFERED INDICATION OF INDIVIDUALLY ADDRESSED TRAFFIC WITH REDUCED POWER CONSUMPTION

(71) Applicant: Apple Inc., Cupertino, CA (US)

(72) Inventors: Kapil Chhabra, Milpitas, CA (US); Veerendra Boodannavar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 14/049,149

(22) Filed: Oct. 8, 2013

(65) Prior Publication Data

US 2014/0098729 A1  Apr. 10, 2014

Related U.S. Application Data

(60) Provisional application No. 61/711,171, filed on Oct. 8, 2012.

(51) Int. Cl.
*H04W 52/02* (2009.01)
(52) U.S. Cl.
CPC .... *H04W 52/0225* (2013.01); *H04W 52/0216* (2013.01); *Y02B 60/50* (2013.01)

(58) Field of Classification Search
USPC ........................................ 370/311
See application file for complete search history.

(56) References Cited

U.S. PATENT DOCUMENTS 8,160,045 B1 * 4/2012 Chhabra ........... H04W 52/0209 370/342
2008/0225768 A1 * 9/2008 Wentink ................. 370/311
2013/0230035 A1 * 9/2013 Grandhi et al. ........... 370/338

* cited by examiner

*Primary Examiner* — Yaotang Wang
(74) *Attorney, Agent, or Firm* — Downey Brand LLP

(57) ABSTRACT

Embodiments provide a technique for enabling a wireless device to operate in a power saving mode without completely cutting off the wireless device from receiving outside communications. The technique includes, at an access point (AP), generating traffic indication map (TIM) information that indicates whether downlink data directed to the wireless device is buffered at the AP. The AP precedes a beacon frame with at least one "lightweight" traffic indication map (TIM) frame that includes the TIM information, which is a subset of the information that is included in the beacon frame. The AP can be configured to transmit the TIM broadcast frame, the beacon frame, and any other frames that include the TIM information during a single transmit opportunity to reduce the number of instances where the wireless device is required to transition from an idle state to a listen state.

20 Claims, 6 Drawing Sheets

BUFFERED INDICATION OF INDIVIDUALLY ADDRESSED TRAFFIC WITH REDUCED POWER CONSUMPTION

CROSS-REFERENCE TO RELATED APPLICATIONS

The present application claims the benefit of U.S. Provisional Application No. 61/711,171, entitled "BUFFERED INDICATION OF INDIVIDUALLY ADDRESSED TRAFFIC WITH REDUCED POWER CONSUMPTION" filed Oct. 8, 2012, the content of which is incorporated herein by reference in its entirety for all purposes.

FIELD OF THE DESCRIBED EMBODIMENTS

The described embodiments relate generally to wireless communications, and, more particularly, to operating a wireless device while in a power saving mode.

BACKGROUND

Wireless devices that follow at least parts of wireless communication protocols set forth by the Institute of Electrical and Electronics Engineers (IEEE) 802.11 standard can operate in a power saving mode. In particular, an access point (AP) that receives downlink data (e.g., from a backend connection) directed to a wireless device associated with the AP can buffer the downlink data when the wireless device is in the power saving mode. The wireless device can periodically wake from the power saving mode and decode a beacon frame that is periodically transmitted from the AP to the wireless device. The beacon frame can include a traffic indication map (TIM) that indicates whether any downlink data is buffered at the AP and available for transfer to the wireless device. When buffered downlink data is indicated in the beacon frame, the wireless device can remain awake and receive the downlink data from the AP.

Unfortunately, when the wireless device misses reception of the beacon frame (e.g., due to interference), the wireless device can remain awake to receive a subsequent beacon frame to determine whether there is any buffered downlink data at the AP pending for the wireless device. This can reduce battery life for the wireless device, especially when there is no downlink data buffered at the AP.

SUMMARY OF THE DESCRIBED EMBODIMENTS

Methods and apparatuses that enable wireless devices to operate in a power saving mode are disclosed herein. An AP is configured to generate and transmit TIM information to a wireless device via "lightweight" first and second TIM broadcast frames, where the first and second TIM broadcast frames include less information than the beacon frame. According to one embodiment, the AP can be configured to transmit the first TIM broadcast frame, the beacon frame, and the second TIM during a single transmit opportunity to reduce the rate at which the wireless device transitions from an idle state to a listen state. The AP can also be configured to transmit the first TIM broadcast frame and the second TIM broadcast frame using different modulation and coding scheme (MCS) indices. The AP can be further configured to transmit the first TIM broadcast frame to the wireless device according to a target TIM transmission time parameter (TTTT) that is based on a target beacon transmission time (TBTT) parameter agreed on between the wireless device and the AP.

The AP can be configured to transmit the first TIM broadcast frame so that the wireless device can readily obtain the TIM information and efficiently determine whether any data is buffered at the AP. In this manner, power savings can be achieved by minimizing the overall amount of time that the wireless device listens for frames. For example, when the first TIM broadcast frame is received at the wireless device, and when the wireless device decodes the TIM information and determines that no downlink data is buffered at the AP, the wireless device can transition from a listen state back into an idle state such that both the beacon frame and the second TIM broadcast frame are ignored, thereby effecting power savings by the wireless device. When the wireless device determines that downlink data is buffered at the AP, the wireless device can transition out of the power saving mode and receive the buffered downlink data.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
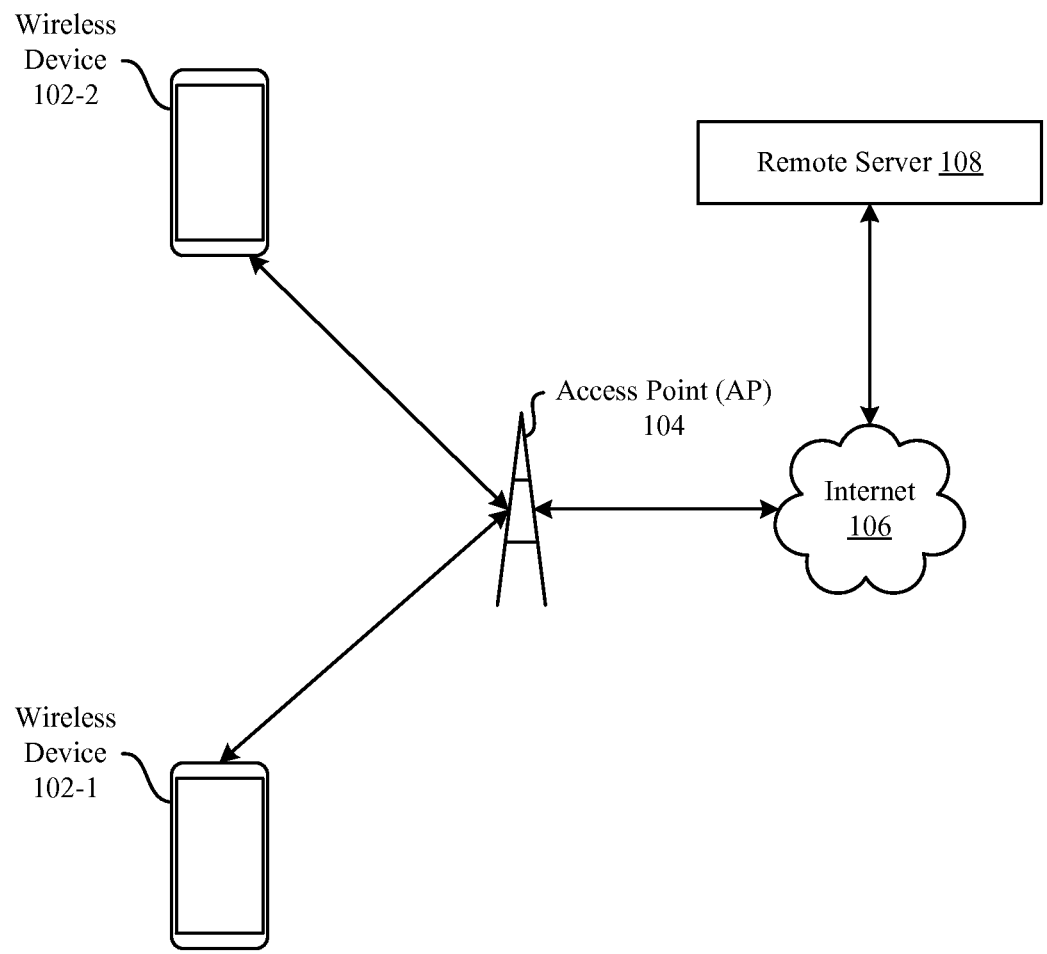
FIG. 1 illustrates communication paths between different devices belonging to a network in accordance with some embodiments.

The described embodiments relate generally to wireless communications, and, more particularly, to operating a wireless device while in a power saving mode.

Wireless devices can incorporate wireless circuitry for multiple different radio access technologies (RATs) to provide connections according to different wireless communication protocols. For example, a wireless device can include wireless circuitry (including combinations of hardware and software) to support a wireless local area network (WLAN) communication protocol, e.g., as standardized by the IEEE 802.11 working group (i.e., IEEE 802.11a/b/g/n/ac, IEEE 802.11-2012, and/or other IEEE 802.11 communication protocols) and promoted by the Wi-Fi Alliance.

According to a variety of these standards, a wireless device can transition into a power saving mode (e.g., when the wireless device is locked/asleep) to help preserve battery life without completely cutting off the wireless device from receiving outside communications (e.g., signaling messages or buffered/time delayed downlink data). In particular, when in the power saving mode, the wireless device can operate in a low power state and periodically wake to receive a beacon frame that is transmitted by an AP with which the wireless device is configured to communicate. To provide the wireless device with the ability to receive downlink data, the beacon frame can contain traffic indication map (TIM) information that indicates to the wireless device whether any downlink data for the wireless device is buffered at the AP. When so indicated, the wireless device can transition out of the power saving mode and receive the buffered downlink data from the AP.

Power consumption, which directly affects wireless device battery life, is proportional to both the duration of time the wireless device stays awake to receive beacon frame and the frequency at which the wireless device wakes up to receive the beacon frame. When the wireless device misses a beacon frame transmission (e.g., due to interference, poor timing synchronization, etc.), the wireless device sits and listens until the next beacon frame is transmitted and received, thereby consuming additional power. Moreover, and according to typical configurations, the beacon frame includes various information that is extraneous to the TIM information—at least with respect to when the wireless device is operating in a power saving mode. Examples of the additional information in the beacon frame include a service set identifier (SSID) parameter, a supported rates parameter, and various capability parameters. This additional/supplemental information renders the beacon frame somewhat bloated in comparison to the "lightweight" TIM information. Consequently, the wireless device is required to stay awake for a longer period of time and consume more power to process the entire beacon frame, thereby decreasing overall power efficiency.

To address the foregoing, embodiments set forth herein provide a technique that includes preceding the beacon frame with a first TIM broadcast frame and succeeding the beacon frame with a second TIM broadcast frame, where each of the first and second TIM broadcast frames contain less information than the beacon frame. In particular, the AP is configured to isolate the TIM information included in the beacon frame and transmit the TIM information to the wireless device via the "lightweight" first and second TIM broadcast frames. According to one embodiment, the AP can be configured to transmit the first TIM broadcast frame, the beacon frame, and the second TIM broadcast frame during a single transmit opportunity. Transmitting these frames using a single transmit opportunity can eliminate a requirement that the wireless device transition between an idle/listen state three separate times (e.g., for each of the first TIM broadcast frame, the beacon frame, and the second TIM broadcast frame), which would otherwise increase overall implementation complexity and decrease frame receipt reliability. The AP can be configured to transmit the first TIM broadcast frame to the wireless device according to a target TIM transmission time parameter (TTTT) that is based on a target beacon transmission time (TBTT) parameter agreed on between the wireless device and the AP (e.g., when the wireless device receives a first beacon frame from the AP).

The AP can be configured to transmit the first TIM broadcast frame so that the wireless device can readily obtain the TIM information and efficiently determine whether any data is buffered at the AP. In this manner, power savings can be achieved by minimizing the overall amount of time that the wireless device listens for frames. For example, when the first TIM broadcast frame is received at the wireless device, and when the wireless device decodes the TIM information and determines that no downlink data is buffered at the AP, the wireless device can transition from a listen state back into an idle state such that both the beacon frame and the second TIM broadcast frame are ignored, thereby effecting power savings by the wireless device. When the wireless device determines that downlink data is buffered at the AP, the wireless device can transition out of the power saving mode and receive the buffered downlink data.

In some cases, one or more of the first TIM broadcast frame, the second TIM broadcast frame, and the beacon frame can be not successfully received by the wireless device (e.g., due to interference). When the first TIM broadcast frame is not successfully received by the wireless device, the wireless device can continue to listen for a subsequent beacon frame, which can also include the TIM information that would have normally been provided by way of the first TIM broadcast frame. Thus, a first level of redundancy is established by way of transmitting the beacon frame. When a beacon frame is received by the wireless device, the TIM information is extracted from the beacon frame and processed in the manner described above with respect to the first TIM broadcast frame. In the event that, as with the first TIM broadcast frame, the beacon frame is not successfully received by the wireless device, the wireless device can continue to listen for the second TIM broadcast frame, which can also include the TIM information that would have normally been provided by way of the first TIM broadcast frame or the beacon frame. Thus, a second level of redundancy is established by way of the second TIM broadcast frame transmission. In the rare event that none of the first TIM broadcast frame, the beacon frame, and the second TIM broadcast frame are received by the wireless device, the wireless device remains in a listen state until TIM information is successfully received by the wireless device via at least one subsequently-transmitted frame.

According to one embodiment, the AP can be configured to transmit the first and second TIM broadcast frames using different MCS indices. For example, the first TIM broadcast frame can be transmitted by the AP using a high order MCS index (e.g., MCS index 31) such that the first TIM broadcast frame can be delivered to the wireless device with low latency and reduce the amount of time that the wireless device is required to remain awake. However, transmitting the first TIM broadcast frame using a high order MCS index can reduce the likelihood that the first TIM broadcast frame is received by the wireless device uncorrupted, so different tradeoffs can be considered by the AP according to a variety of factors that are discussed below in greater detail. Moreover, the AP can be configured to transmit the second TIM broadcast frame using a low order MCS index (e.g., MCS index 1) to ensure that, when the wireless listens for the second TIM broadcast frame, which can indicate that both the first TIM broadcast frame and the beacon frame were not successfully received by the wireless device, the wireless device has a higher likelihood of successfully receiving the second TIM broadcast frame.

Other embodiments include configuring the AP to transmit both the first and the second TIM broadcast frames prior to the beacon frame, e.g., in environments where, on average, only a small amount of downlink data is required to be buffered at the AP. Moreover, in some embodiments, each of the first and second TIM broadcast frames can include clock synchronization data (e.g., time synchronization function (TSF) information) to ensure that the wireless device and the AP are synchronized, thereby reducing any power loss that occurs when frames are not effectively transmitted between the wireless device and the AP.

FIG. 1 illustrates communication paths between different devices belonging to a network 100 in accordance with some embodiments. As shown in FIG. 1, the network 100 can include wireless devices 102-1 and 102-2 that are in communication with an AP 104. According to the embodiment shown in FIG. 1, the AP 104 is configured to provide a WLAN to the wireless devices 102. Examples of wireless devices 102 can include smartphones (e.g., Apple's® iPhone®), laptops, desktop computers, or any other type of computing device that capable of operating on a WLAN. Examples of the AP 104 can include wireless routers (e.g., Apple's® Airport Extreme®), wireless access points, modems that include WLAN functionality, or any other computing device that is capable of providing a WLAN.

As also shown in FIG. 1, the AP 104 can be configured to communicate with other entities—such as the remote server 108—via an internet connection 106 that is accessible to the AP 104. In particular, and as described in greater detail below, the remote server 108 represents an example of a device that can provide downlink data to one of the wireless devices 102 (e.g., the wireless device 102-1). As set forth above, the AP 104 is configured to buffer the data when the wireless device 102 is in a power saving mode and periodically transmit TIM information (via TIM broadcast frames and beacon frames) to the wireless device 102-1.

Figure 2:
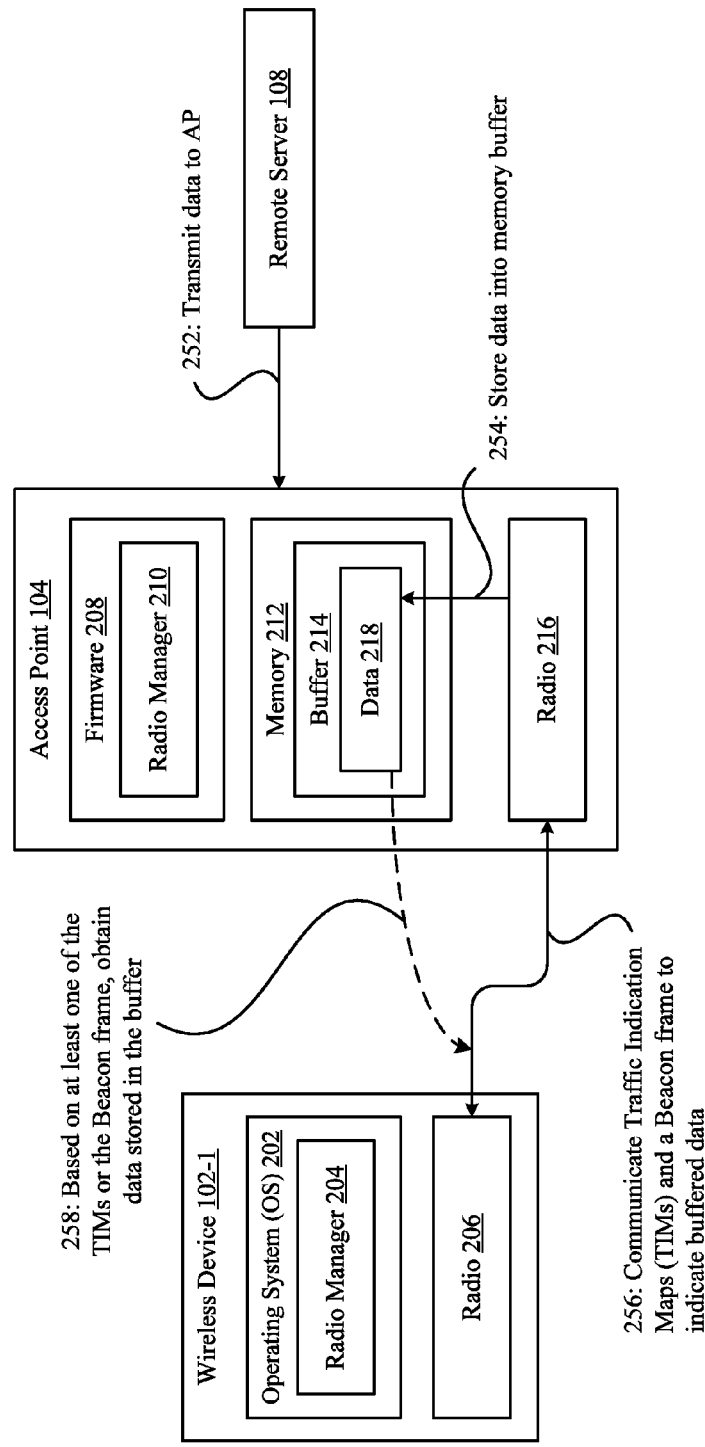
FIG. 2 illustrates a sequence of actions performed between the devices of FIG. 1 in accordance with some embodiments.

FIG. 2 illustrates a sequence 200 of actions performed between the set of wireless networking equipment of FIG. 1 in accordance with some embodiments. As shown in FIG. 2, the wireless device 102-1 can include an operating system (OS) 202 and a radio 206, where a radio manager 204 is configured to manage the operation of the radio 206. According to one embodiment, the radio 206 represents wireless circuitry that supports different wireless communication protocols and/or radio access technologies. In some embodiments, the wireless device 102-1 can include separate wireless circuitry for different wireless communication protocols and/or radio access technologies. In some embodiments, the wireless device 102-1 can include a combined, integrated block of wireless circuitry that can support a combination of different wireless communication protocols and/or different radio access technologies. According to one embodiment, the radio 206 can represent WLAN wireless circuitry coupled to one or more antennas. In some embodiments, the radio 206 is coupled to separate antennas and can use different hardware processing elements. In some embodiments, the radio 206 is coupled to one or more common antennas and can use a common set of hardware processing elements. The radio 206 can include transmitters and receivers to provide signal processing of radio frequency wireless signals formatted according to wireless communication protocols, e.g., a Wi-Fi WLAN wireless communication protocol. In some embodiments, the radio 206 can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

The radio 206 can be connected to additional processing circuitry in the wireless device 102-1, including an application processor that can provide higher layer processing, e.g., application and transport layer protocol processing. The application processor can be connected to an input/output (IO) block through which information can be displayed to a user of the wireless device 102-1 (e.g., via a display) and also through which the user of the wireless device 102-1 can enter information. In some embodiments, a common input/output (IO) block can be used both to display information to the user and to accept user inputs. In an embodiment, the application processor can control functionality performed by all or portions of the radio 206. The application processor can also power down portions of the WLAN to reduce power consumption based on various operating conditions, e.g., when the wireless device 102-1 is locked/asleep, operating solely on battery power, and the like. Moreover, the application processor can power down portions of the WLAN to reduce power consumption based of expiration of one or more dormancy timers (e.g., the TTTT and TBTT described herein).

FIG. 2 also illustrates a breakdown of the internal components of the AP 104 of FIG. 1, which includes firmware 208 (including a radio manager 210), a memory 212 (including a buffer 214), and a radio 216. According to one embodiment, the radio 216 is configured to provide a WLAN to the wireless device 102-1 using hardware/software features that are similar to those provided by the radio 206 described above. Moreover, the AP 104, according to the sequence 200 shown in FIG. 2, can be configured to interface with the remote server 108 (e.g., via the internet 106) and receive from the remote server 108 downlink data that is directed to the wireless device 102-1. The AP can then process the downlink data according to the high-level steps 252-258 described below in conjunction with FIG. 2.

As shown in FIG. 2, the sequence 200 begins at a step 252, which involves the remote server 108 transmitting to the AP 104 downlink data that is directed to the wireless device 102-1. At step 254, the AP 104 stores the downlink data (depicted as data 218) in the buffer 214 included in the memory 212. In particular, the AP 104 chooses to buffer the data 218 when the AP 104 determines that the wireless device 102-1 is operating in a power saving mode. At step 256, the AP 104 communicates a first TIM broadcast frame, a beacon frame, and a second TIM broadcast frame to the wireless device 102-1, where each of the frames includes TIM information that indicates the data 218 is stored in the buffer 214. When at least one of the frames is successfully received by the wireless device 102-1, at step 258, the wireless device 102-1 obtains the data 218 stored in the buffer 214.

Figure 3A:
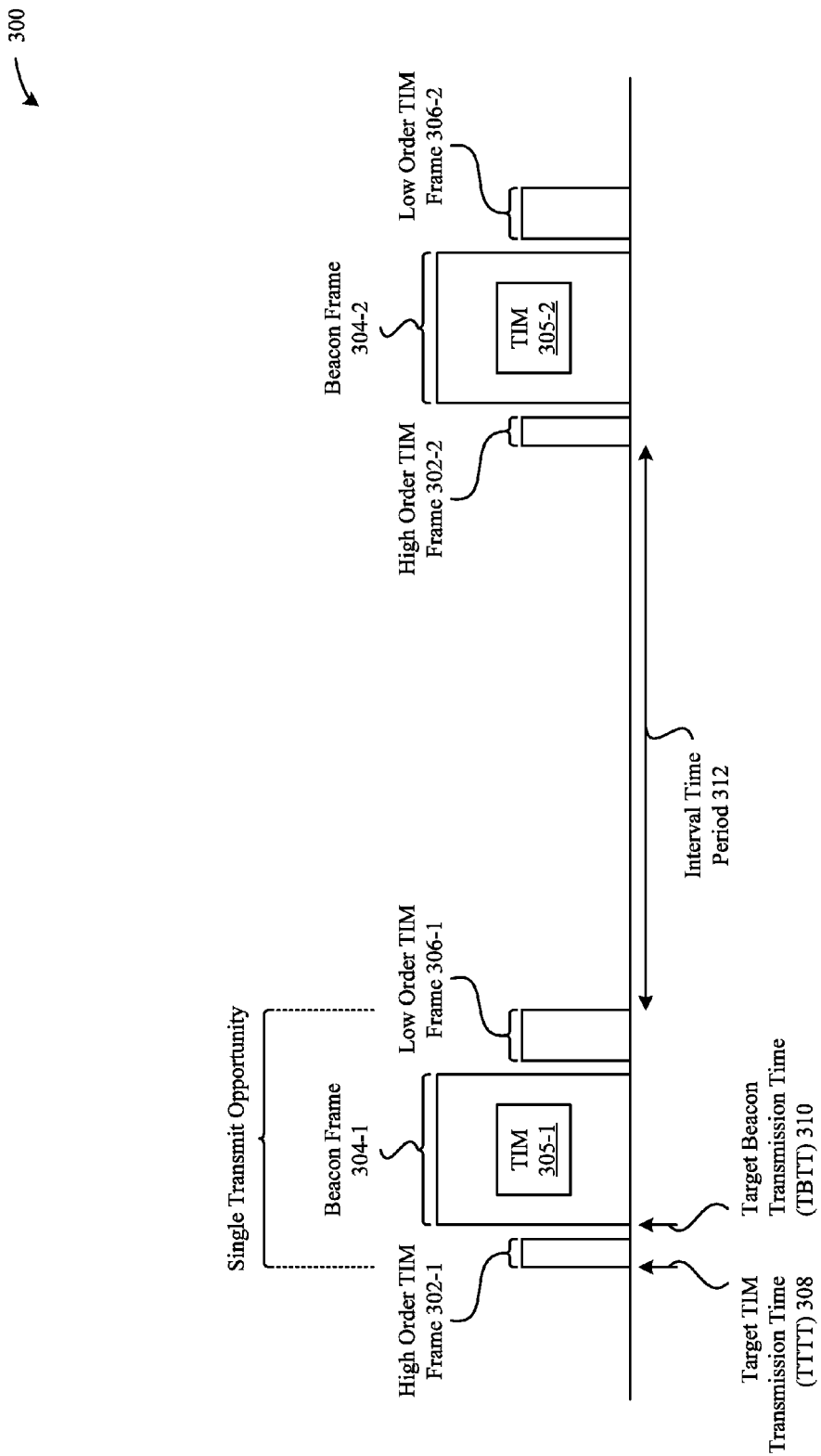
FIGS. 3A-3B illustrate representative formats for communicating TIM broadcast frames in conjunction with beacon frames through a wireless network in accordance with some embodiments.
Figure 3B:
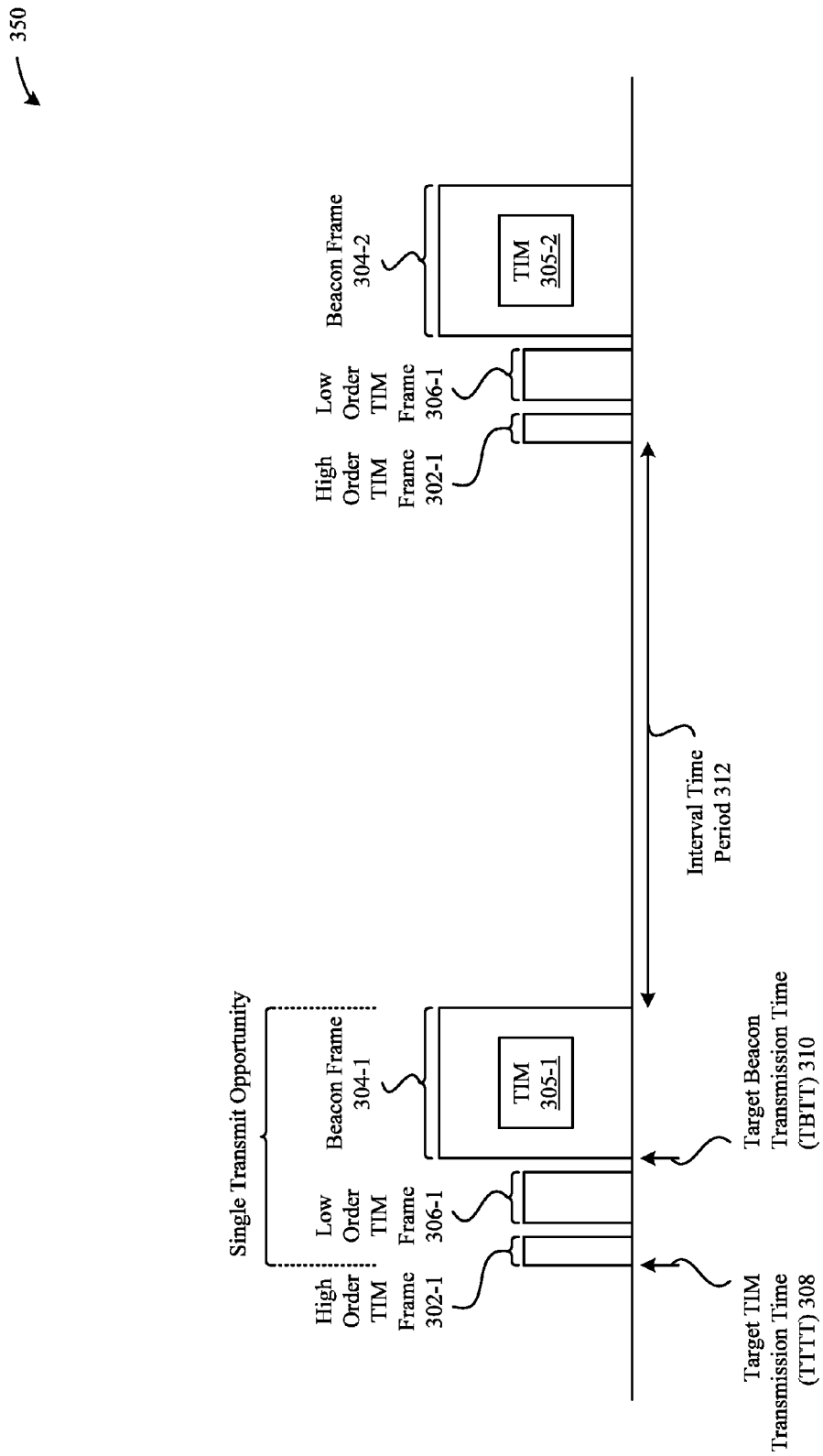

FIG. 3A and FIG. 3B illustrate representative formats 300 and 350, respectively, for communicating TIM broadcast frames in conjunction with beacon frames through a wireless network in accordance with some embodiments. In particular, FIG. 3A represents an embodiment that involves transmitting a first TIM broadcast frame, a beacon frame, and then a second TIM broadcast frame (via a single transmit opportunity), whereas FIG. 3B represents another embodiment that involves transmitting a first TIM broadcast frame, a second TIM broadcast frame, and then a beacon frame (also via a single transmit opportunity). It is noted that, although not explicitly illustrated by the FIGs., additional sequences and numbers of frames can also be implemented to achieve the same power saving benefits. For example, in an auxiliary embodiment, a first, second, and third TIM broadcast frame can be transmitted prior to each beacon frame, where different-ordered MCS indices (e.g., high order, medium order, and low order, respectively) are used to transmit the TIM broadcast frames.

In FIG. 3A, immediately prior to the TTTT 308, the wireless device 102-1 is in an idle mode and transitions into a listen mode prior to the broadcast of the high order TIM broadcast frame 302-1. As previously noted herein, when the wireless device 102-1 successfully receives the high order TIM broadcast frame 302-1—and the TIM information stored therein indicates that no downlink data is buffered at the AP—the wireless device 102-1 can transition back into the idle mode and ignore the subsequent beacon frame 304-1 and the low order TIM broadcast frame 306-1, thereby saving power. However, when the wireless device 102-1 does not successfully receive the high order TIM broadcast frame 302-1 (e.g., it is corrupted), the wireless device 102-1 remains in the listen mode. Subsequently, the wireless device 102-1 attempts to receive/process the beacon frame 304-1 and/or the low order TIM broadcast frame 306-1 in the manner previously set forth herein (i.e., according to successful/unsuccessful receipt of the beacon frame 304-1 and/or the low order TIM broadcast frame 306-1, and/or according to what is indicated by the TIM information). When none of the high order TIM broadcast frame 302-1, the beacon frame 304-1, and the low order TIM broadcast frame 306-1 are received by the wireless device 102-1, the wireless device remains in the listen mode for at least an amount of time represented by the interval time period 312 depicted in FIG. 3A, which consumes power and is not ideal. When the interval time period 312 ends, the wireless device 102-1 is in the listen mode and attempts to receive and process any of the high order TIM broadcast frame 302-2, the beacon frame 304-2, the low order TIM broadcast frame 306-2 according to the techniques described above.

As noted above, FIG. 3B illustrates an alternative embodiment that involves transmitting a first TIM broadcast frame, a second TIM broadcast frame, and then a beacon frame. As shown in FIG. 3B, the wireless device 102-1 is in an idle mode and transitions into a listen mode prior to the broadcast of the high order TIM broadcast frame 302-1, and is handled in the manner set forth above in conjunction with FIG. 3A. When the wireless device 102-1 does not receive the high order TIM broadcast frame 302-1 (e.g., it is corrupted), the wireless device 102-1 remains in the listen mode. Subsequently, the wireless device 102-1 attempts to receive/process the low order TIM broadcast frame 306-1 and/or the beacon frame 304-1 in the manner previously set forth herein (i.e., according to successful/unsuccessful receipt of the low order TIM broadcast frame 306-1 and/or the beacon frame 304-1, and/or according to what is indicated by the TIM information). As in FIG. 3A, when none of the high order TIM broadcast frame 302-1, the low order TIM broadcast frame 306-1, and the beacon frame 304-1 are received by the wireless device 102-1, the wireless device remains in the listen mode for at least an amount of time represented by the interval time period 312 depicted in FIG. 3B, which consumes power and is not ideal. In either event, when the interval time period 312 ends, the wireless device 102-1 is in the listen mode and attempts to receive and process any of the high order TIM broadcast frame 302-2, the low order TIM broadcast frame 306-2, and the beacon frame 304-2 according to the techniques described above.

Figure 4:
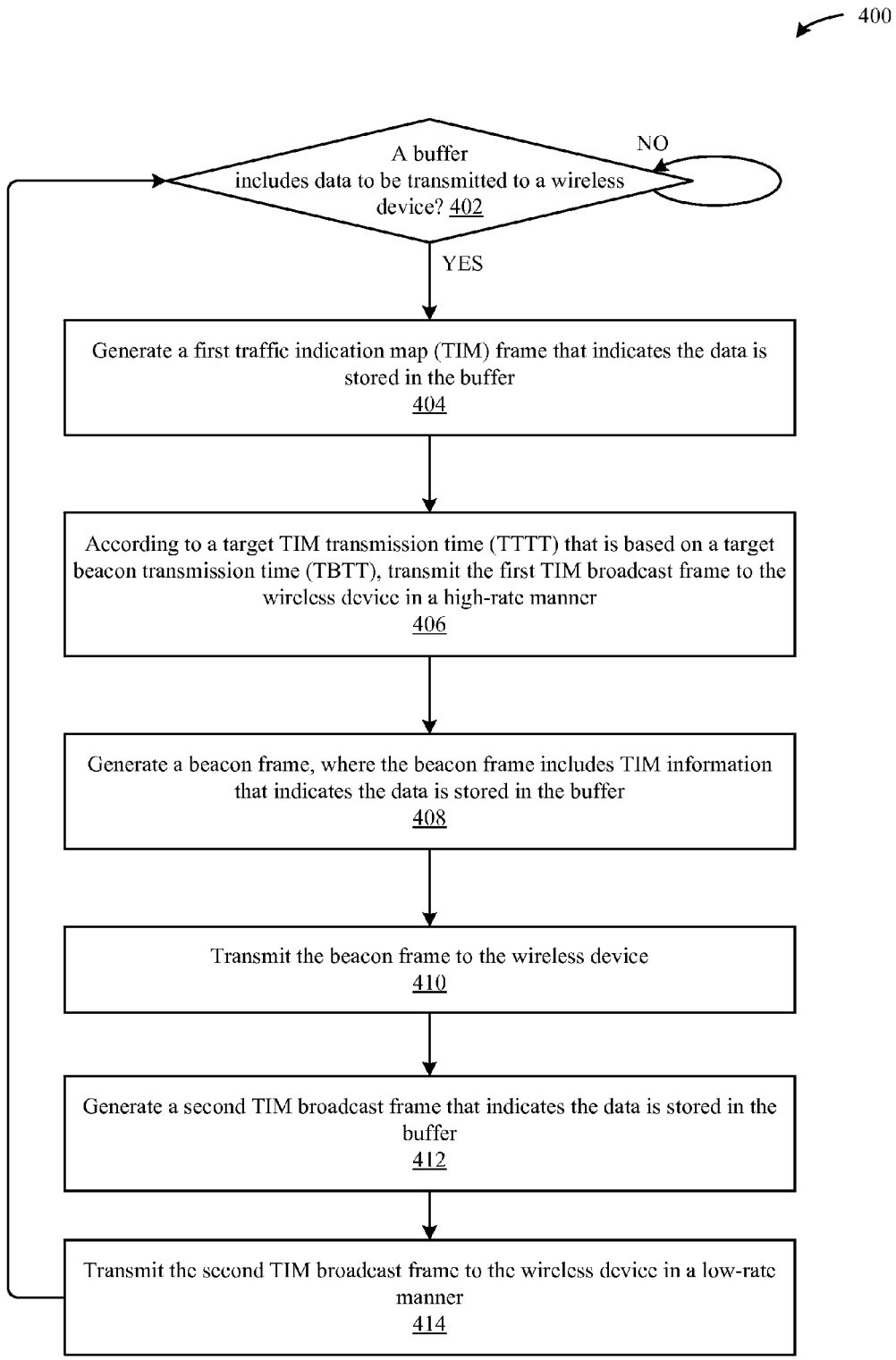
FIG. 4 illustrates a flowchart of a method for an AP to transmit TIM broadcast frames in conjunction with beacon frames to a wireless device in accordance with some embodiments.

FIG. 4 illustrates a flowchart of a method 400 for an AP (e.g., the AP 104) to transmit TIM broadcast frames in conjunction with beacon frames to a wireless device (e.g., the wireless device 102-1) in accordance with some embodiments. As shown in FIG. 4, the method 400 begins at step 402, the radio manager 210 of the AP 104 determines whether the buffer 214 includes downlink data to be transmitted to the wireless device 102-1. When, at step 402, the radio manager 210 determines that the buffer 214 includes downlink data to be transmitted to the wireless device 102-1, the method proceeds to step 404. Otherwise, the method 400 repeats at step 402 until the radio manager 210 determines that the buffer 214 includes downlink data to be transmitted to the wireless device 102-1.

At step 404, the radio manager 210 generates a first TIM broadcast frame that indicates the downlink data is stored in the buffer 214. At step 406, the radio manager 210 transmits, according to a TTTT that is based on a TBTT (e.g., as shown in FIGS. 3A-3B and described above), the first TIM broadcast frame to the wireless device in a high-rate manner (e.g., using a high order MCS index). At step 408, the radio manager 210 generates a beacon frame, where the beacon frame includes the TIM information that indicates the downlink data is stored in the buffer 214. At step 410, the radio manager 210 transmits the beacon frame to the wireless device 102-1. At step 412, the radio manager 210 generates a second TIM broadcast frame that indicates the downlink data is stored in the buffer. At step 414, the radio manager 210 transmits the second TIM broadcast frame to the wireless device 102-1 in a low-rate manner (e.g., using a low order MCS index).

Figure 5:
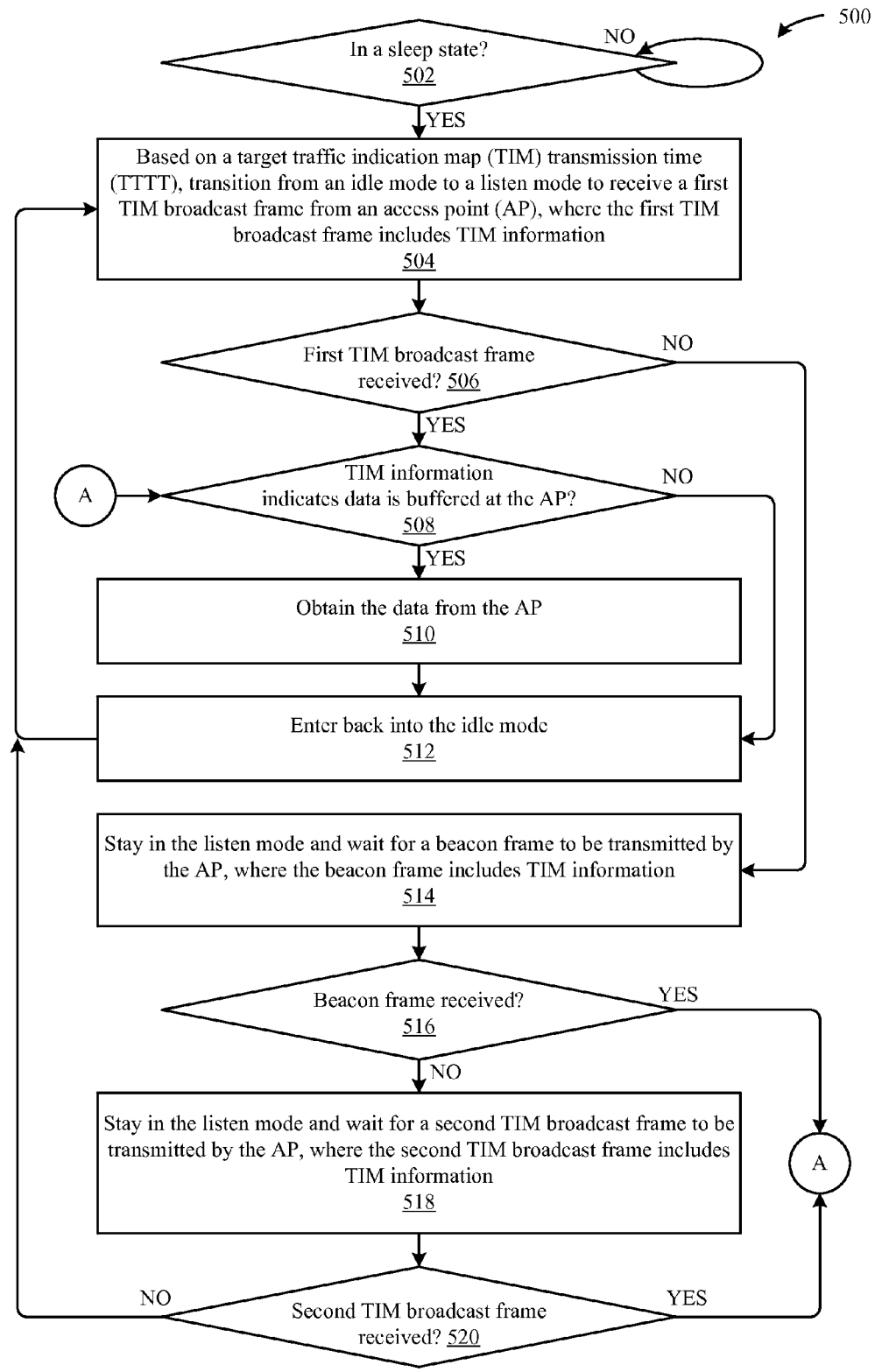
FIG. 5 illustrates a flowchart of a method for a wireless device to receive TIM broadcast frames in conjunction with beacon frames from an AP in accordance with some embodiments.

FIG. 5 illustrates a flowchart of a method 500 for a wireless device (e.g., the wireless device 102-1) to receive TIM broadcast frames in conjunction with beacon frames from an AP (e.g., the AP 104) in accordance with some embodiments. As shown, the method 500 begins at step 502, where the radio manager 204 of the wireless device 102-1 determines whether the AP 104 is in a sleep state (e.g., is locked/asleep). At step 504, the radio manager 204 transitions, based on a TTTT (e.g., as shown in FIGS. 3A-3B and described above) agreed on with the AP 104, the radio 206 from an idle mode to a listen mode to receive a first TIM broadcast frame from the AP 104, where the first TIM broadcast frame includes TIM information. At step 506, the radio manager 204 determines whether the first TIM broadcast frame is successfully received (i.e., uncorrupted, or such that the first TIM broadcast frame can be successfully decoded by the wireless device). When, at step 506, the radio manager 204 determines that a first TIM broadcast frame is received, the method 500 proceeds to step 508. Otherwise, the method 500 proceeds to step 514, where the radio manager 204 waits for the beacon frame according to the additional steps described below.

At step 508, the radio manager 204 determines whether the TIM information indicates downlink data is buffered at the AP 104. When, at step 508, the radio manager 204 determines that the TIM information indicates that downlink data is buffered at the AP 104, the method 500 proceeds to step 510, where the radio manager 204 obtains the downlink data from the AP 104. Otherwise, the method 500 proceeds to step 512, where the radio manager 204 transitions the radio 206 from the listen mode to the idle mode until a subsequent first TIM broadcast frame is transmitted by the AP 104 (e.g., as shown in FIGS. 3A-3B).

At step 514, the radio manager 204 keeps the radio 206 in the listen mode and waits for a beacon frame to be transmitted by the AP 104, where the beacon frame also includes the TIM information that would have otherwise been provided by the first TIM broadcast frame had it been received at step 506. At step 516, the radio manager 204 determines whether the beacon frame is received. When, at step 516, the radio manager 204 determines that the beacon frame is received, the method 500 proceeds to back to step 508. Otherwise, the method 500 proceeds to step 518. At step 518, the radio manager 204 keeps the radio 206 in the listen mode and waits for a second TIM broadcast frame to be transmitted by the AP 104, where the second TIM broadcast frame also includes the TIM information that would have otherwise been provided by the first TIM broadcast frame or the beacon TIM broadcast frame had they been received at steps 506 and 516, respectively.

At step 520, the radio manager 204 determines whether the second TIM broadcast frame received. When, at step 520, the radio manager 204 determines that second TIM broadcast frame is received, the method 500 proceeds to step 508. Otherwise, the method 500 proceeds back to step 504, where the radio manager 204 keeps the radio 206 in the listen mode in order to receive one or more subsequently transmitted TIM broadcast frames and beacon frames.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for indicating to a wireless device whether downlink data directed to the wireless device is buffered at an access point (AP), the method comprising:

by the AP:
generating traffic indication map (TIM) information that indicates whether downlink data is buffered;
generating a first TIM broadcast frame and a second TIM broadcast frame, wherein each of the first TIM broadcast frame and the second TIM broadcast frame include the TIM information;
generating a beacon frame, wherein the beacon frame includes both the TIM information and supplemental wireless network information;
transmitting, to the wireless device during a single transmit opportunity that spans a time period less than a time interval between two successive beacon frames, each of the first TIM broadcast frame, the beacon frame, and the second TIM broadcast frame; and
when the TIM information included in the second TIM broadcast frame indicates that corresponding downlink data is buffered at the AP:
providing the downlink data to the wireless device.

2. The method of claim 1, wherein the first TIM broadcast frame is transmitted prior to the beacon frame, and the beacon frame is transmitted prior to the second TIM broadcast frame.

3. The method of claim 1, wherein the first TIM broadcast frame is transmitted prior to the second TIM broadcast frame, and the second TIM broadcast frame is transmitted prior to the beacon frame.

4. The method of claim 1, wherein the first TIM broadcast frame is encoded using a high order modulation and coding scheme (MCS) index and the second TIM broadcast frame is encoded using a low order MCS index.

5. The method of claim 1, wherein the wireless device remains in an uninterrupted listen mode when receiving each of the first TIM broadcast frame, the second TIM broadcast frame, and the beacon frame.

6. The method of claim 1, wherein the first TIM broadcast frame is transmitted to the wireless device at a target TIM transmission time (TTTT) that is based on a target beacon transmission time (TBTT) parameter.

7. The method of claim 1, further comprising:
including time synchronization function (TSF) information in each of the first TIM broadcast frame, the beacon frame, and the second TIM broadcast frame.

8. A method for receiving and processing frames that include traffic indication map (TIM) information, wherein the TIM information indicates whether corresponding downlink data is buffered at an access point (AP), the method comprising:
while a wireless device is in a listen mode, attempting to receive from the AP a first TIM broadcast frame that includes the TIM information; and
when the first TIM broadcast frame is received uncorrupted, and the TIM information included in the first TIM broadcast frame indicates that no corresponding downlink data is buffered at the AP:
transitioning the wireless device from the listen mode to an idle mode without attempting to receive a beacon frame that follows the first TIM broadcast frame, and
when the first TIM broadcast frame is not received uncorrupted:
remaining in the listen mode for a beacon frame that includes the TIM information; and
attempting to receive the beacon frame, wherein, during a single transmit opportunity that spans a time period less than a time interval between two successive beacon frames, the wireless device remains in an uninterrupted listen mode when attempting to receive each of the first TIM broadcast frame and the beacon frame.

9. The method of claim 8, further comprising:
when the first TIM broadcast frame is received uncorrupted, and the TIM information included in the first TIM broadcast frame indicates that corresponding downlink data is buffered at the AP:
receiving the downlink data from the AP.

10. The method of claim 8, further comprising:
synchronizing a clock based on time synchronization function (TSF) information included in the first TIM broadcast frame when the first TIM broadcast frame is received uncorrupted.

11. The method of claim 8, wherein remaining in the uninterrupted listen mode includes attempting to receive the beacon frame from the AP.

12. The method of claim 11, wherein the beacon frame further includes supplemental wireless network information.

13. The method of claim 11, wherein:
when the beacon frame is received uncorrupted, and the TIM information included in the beacon frame indicates that no corresponding downlink data is buffered at the AP:
transitioning from the listen mode to the idle mode without attempting to receive a second TIM broadcast frame that follows the beacon frame, and
when the beacon frame is not received uncorrupted:
remaining in the listen mode for a second TIM broadcast frame that includes the TIM information, wherein the single transmit opportunity includes the first TIM broadcast frame, the beacon frame, and the second TIM broadcast frame.

14. The method of claim 13, wherein each of the first TIM broadcast frame, the beacon frame, and the second TIM broadcast frame are transmitted by the AP using a different modulation and coding scheme (MCS) index.

15. The method of claim 8, further comprising:
prior to attempting to receive the first TIM broadcast frame, transitioning from an idle mode to a listen mode based on a target TIM transmission time (TTTT) that is based on a target beacon transmission time (TBTT) parameter associated with the AP.

16. A system that includes an access point (AP) and a wireless device, wherein:
the AP is configured to:
generate traffic indication map (TIM) information that indicates whether downlink data directed to the wireless device is buffered at the AP, and
transmit, to the wireless device during a single transmit opportunity that spans a time period less than a time interval between two successive beacon frames, the TIM information via at least a first TIM broadcast frame and a beacon frame, wherein each of the first TIM broadcast frame and the beacon frame includes the TIM information, and the beacon frame includes supplemental wireless information; and
the wireless device is configured to:
attempt to receive the first TIM broadcast frame from the AP,
when the first TIM broadcast frame is received uncorrupted and the TIM information included in the first TIM broadcast frame indicates that downlink data directed to the wireless device is not buffered in a memory that is accessible to the AP:
transition from a listen mode to an idle mode without attempting to receive the beacon frame that follows the first TIM broadcast frame, and
when the first TIM broadcast frame is not received uncorrupted:
remain in the listen mode for the beacon frame that includes the TIM information, and
attempt to receive the beacon frame, wherein, during the single transmit opportunity, the wireless device remains in an uninterrupted listen mode when attempting to receive each of the first TIM broadcast frame and the beacon frame.

17. The system of claim 16, wherein the first TIM broadcast frame is transmitted using a high order modulation and coding scheme (MCS) index.

18. The system of claim 16, wherein the beacon frame includes time synchronization function (TSF) information.

19. The system of claim 16, wherein the wireless device is further configured to, when each of the first TIM broadcast frame and the beacon frame is not received uncorrupted:
remain in the listen mode; and
attempt to receive a second TIM broadcast frame transmitted by the AP, wherein the second TIM broadcast frame includes the TIM information, and wherein the single transmit opportunity includes the second TIM broadcast frame.

20. The system of claim 16, wherein, when the beacon frame is received uncorrupted, and the TIM information included in the beacon frame indicates that no corresponding downlink data is buffered at the AP:
transitioning from the listen mode to the idle mode without attempting to receive a second TIM broadcast frame that follows the beacon frame.

* * * * *